United States Patent [19]

Harada et al.

[11] Patent Number: 6,008,981
[45] Date of Patent: Dec. 28, 1999

[54] MONOLITHIC CERAMIC CAPACITOR

[75] Inventors: Kazuhiro Harada, Shiga-ken; Harunobu Sano, Kyoto, both of Japan

[73] Assignee: Murata Manufacturing Co., Ltd.

[21] Appl. No.: 09/028,403

[22] Filed: Feb. 24, 1998

[30] Foreign Application Priority Data

Mar. 4, 1997 [JP] Japan ................................. 9-049199

[51] Int. Cl.$^6$ ................................ H01G 4/30; H01G 4/12
[52] U.S. Cl. .......................... 361/321.4; 361/321.5; 361/306.3; 361/313; 361/309; 501/134; 501/137
[58] Field of Search ............ 361/311–313, 321.1–321.5, 361/301.1, 303–305, 306.1, 306.3, 308.1, 309, 320, 322; 501/134–137

[56] References Cited

U.S. PATENT DOCUMENTS

| | | | |
|---|---|---|---|
| 5,734,545 | 3/1998 | Sano et al. | 361/321.4 |
| 5,815,368 | 9/1998 | Sakamoto et al. | 361/321.5 |
| 5,818,686 | 10/1998 | Mizuno et al. | 361/311 |
| 5,822,176 | 10/1998 | Sano et al. | 361/321.4 |
| 5,835,340 | 11/1998 | Wada et al. | 361/321.5 |
| 5,841,626 | 11/1998 | Sano et al. | 361/321.5 |
| 5,852,542 | 12/1998 | Wada et al. | 361/321.5 |

*Primary Examiner*—Kristine Kincaid
*Assistant Examiner*—Eric W. Thomas
*Attorney, Agent, or Firm*—Ostrolenk, Faber, Gerb & Soffen, LLP

[57] ABSTRACT

A dielectric ceramic composition including: a barium titanate containing principal component represented by the formula: $(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ wherein $M_2O_3$ is at least one of $Sc_2O_3$ and $Y_2O_3$; $Re_2O_3$ is at least one of $Sm_2O_3$, $Eu_2O_3$, and $Gd_2O_3$; $0.0025 \leq \alpha+\beta \leq 0.025$, $0 < \beta \leq 0.0075$, $0.0025 \leq \gamma \leq 0.05$, $\gamma/(\alpha+\beta) \leq 4$, $0 \leq x < 1.0$, $0 \leq y < 1.0$, $0 \leq x+y < 1.0$, and $1.000 < m \leq 1.035$, at least one of scandium oxide and yttrium oxide, at least one of samarium oxide, europium oxide and gadolinium oxide, and at least one oxide of magnesium in an amount of from about 0.5 to 5.0 mols calculated as MgO to 100 mols of the principal components and further containing from about 0.2 to 3.0 parts by weight of an $Al_2O_3$—MO—$B_2O_3$ oxide glass, wherein MO is at least one of BaO, CaO, SrO, MgO, ZnO, and MnO, to 100 parts by weight of the sum total of the principal components and magnesium oxide.

20 Claims, 2 Drawing Sheets

FIG. 1
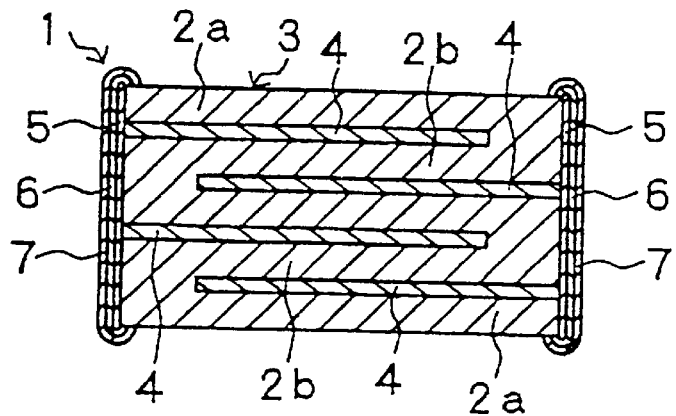
FIG. 2
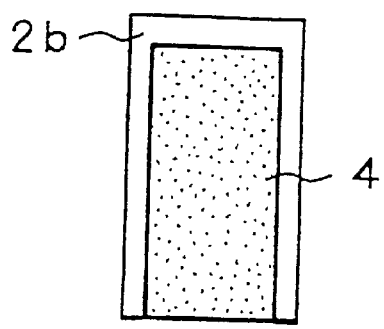
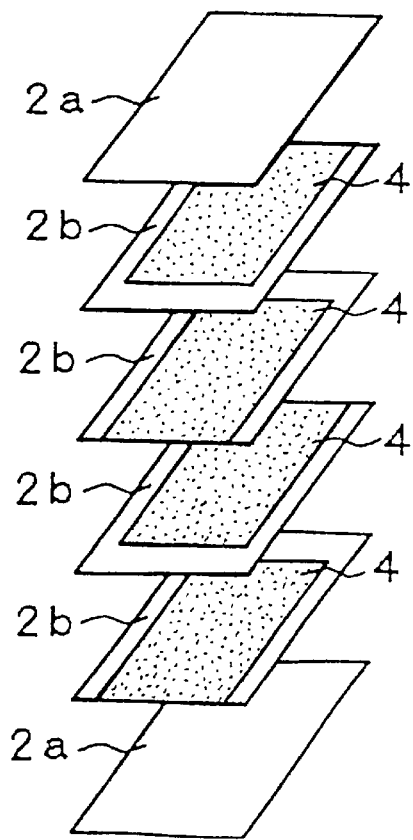
FIG. 3

MONOLITHIC CERAMIC CAPACITOR

FIELD OF THE INVENTION

The present invention relates to a ceramic capacitor used for electronic equipment, and more particularly to a monolithic ceramic capacitor having internal electrodes made of nickel or a nickel alloy.

BACKGROUND OF THE INVENTION

The production process for a monolithic ceramic capacitor is generally as follows. First, sheet-form dielectric ceramic materials having a surface which is coated with an electrode material which becomes an internal electrode, are prepared. As the dielectric ceramic material, for example, a material made of $BaTiO_3$ as the principal component is used. Then, the sheet-form dielectric ceramic materials coated with the electrode material are laminated by pressing under heat and by calcining the integrated laminate at a temperature of from 1,250 to 1,350° C., a dielectric ceramic having internal electrodes is obtained. Also, by firing external electrodes to connect to the internal electrodes at the edge surfaces, a monolithic ceramic capacitor is obtained.

Accordingly, the material of the internal electrode is required to meet to following conditions:

(a) Because the dielectric ceramic and the internal electrodes are simultaneously calcined, the material of the internal electrode has a melting point which is the same as or higher than the temperature at which the dielectric ceramic is calcined.

(b) The material is not oxidized even in an oxidative high-temperature atmosphere and does not react with the dielectric ceramic.

As the electrodes meeting such conditions, a noble metal or alloy thereof, such as platinum, gold, palladium, silver-palladium alloy and the like, has been used. However, although these electrode materials have excellent characteristics, they are expensive, and are the largest factor increasing the production cost of monolithic ceramic capacitors.

Other high-melting materials include such base metals as Ni, Fe, Co, W, Mo and the like but these base metals are easily oxidized in a high-temperate oxidative atmosphere, whereby they become unusable as an electrode. Accordingly, to use these base metals as the internal electrodes of a monolithic ceramic capacitor, it is necessary to calcine the base metal together with a dielectric ceramic in a neutral or reducing atmosphere. However, conventional dielectric ceramic materials have the fault that when the materials are calcined in such a neutral or reducing atmosphere, they are greatly reduced and become semiconductor-like materials.

To overcome the fault described above, there are proposed, for example, a dielectric ceramic material wherein the barium site/titanium site ratio is in excess of the stoichiometric ratio in a barium titanate solid solution as shown in JP-B-57-42588 and a dielectric ceramic material made up of a barium titanate solid solution added with an oxide of a rare earth element such as La, Nd, Sm, Dy, Y, etc., as shown in JP-A-61-101459.

Also, as a dielectric ceramic material having a reduced temperature change of the dielectric constant, there are proposed, for example, a dielectric ceramic material of a $BaTiO_3$—$CaZrO_3$—$MnO$—$MgO$ series composition as shown in JP-A-62-256422 and a dielectric ceramic material of a $BaTiO_3$—$(Mg, Zn, Sr, Ca)O$—$B_2O_3$—$SiO_2$ series composition as shown in JP-B-61-14611.

By using such dielectric ceramic materials as described above, a dielectric ceramic which does not become a semiconductor-like material even when the material is calcined in a reducing atmosphere and the production of a monolithic ceramic capacitor using a base metal such as nickel and the like as the internal electrodes becomes possible.

With recent developments in electronics, the small-sizing of electronic parts has proceeded quickly and the desire to increase the capacity of monolithic ceramic capacitors has also become remarkable. Thus, the increase of the dielectric constant of a dielectric ceramic material and thinning of a dielectric ceramic layer have proceeded very quickly. Accordingly, the demand for a dielectric ceramic material having a high dielectric constant, showing a small temperature change of the dielectric constant, and having excellent reliability has become large.

The dielectric ceramic materials shown in JP-B-57-42588 and JP-A-61-101459 give a large dielectric constant but have the faults that the crystal grains of the dielectric ceramic obtained are large so that when the thickness of the dielectric ceramic layer in the monolithic ceramic capacitor becomes thin as 10 $\mu$m or thinner, the number of the crystal grains in each layer is reduced, and the reliability is lowered. Furthermore, there is also a problem in the dielectric ceramic materials that the temperature change of the dielectric constant is large. Thus, the above-described dielectric ceramic materials cannot meet the requirements of the market.

Also, the dielectric constant in the dielectric ceramic material shown in JP-A-62-256422 is relatively high, the crystal grains of the dielectric ceramic obtained are small and the temperature change of the dielectric constant is small but because $CaZrO_3$ and also $CaTiO_3$ formed in the calcining process are liable to form a secondary phase with MnO, etc., there is a problem of reliability at high temperature.

Furthermore, there are faults in the dielectric ceramic material shown in JP-B-61-14611 in that the dielectric constant of the dielectric ceramic obtained is from 2,000 to 2,800 and that the material is disadvantageous from the view point of small-sizing and increasing the capacity of the monolithic ceramic capacitor. Also, there is a problem in that the dielectric ceramic material cannot satisfy the X7R characteristics prescribed by the EIA standard, that is, the characteristic that the changing ratio of the electrostatic capacity is within 15% in the temperature range of from −55° C. to +125° C.

Moreover, in the non-reducing dielectric ceramic disclosed in JP-A-63-103861, the insulation resistance and the temperature changing ratio of the capacity are largely influenced by the crystal size of $BaTiO_3$, which is the principal component, whereby control for obtaining stable characteristics is difficult. Also, when the insulation resistance is shown as the product with the electrostatic capacity (i.e., CR), that product is from 1,000 to 2,000 M$\Omega$·$\mu$F and thus, it cannot be said that the non-reducing dielectric ceramic is commercially usable.

To solve the above-described problems, various components are proposed in JP-A-5-9066, JP-A-5-9067, and JP-A-5-9068. However, as a result of the requirement for further small-sizing and further increasing capacity, the requirements of the market for thinning the thickness of the dielectric ceramic layer and more severe reliability requirements, the need for a dielectric ceramic material having even better reliability and ability to cope with thinning the layer thickness have increased.

When a dielectric ceramic layer is simply thinned at a definite rated voltage, the field strength per layer is increased. Accordingly, the insulation resistance at room temperature and high temperature is lowered and the reliability is greatly lowered. Thus, it is necessary to lower the rated voltage when thinning the dielectric ceramic layer in conventional dielectric ceramic.

Accordingly, the necessary of providing a monolithic ceramic capacitor which does not require lowering the rated voltage even when the thickness of the dielectric ceramic layer is thinned, has a high insulation resistance under a high electric field strength, and has excellent reliability, has occurred.

To cope with surface mounting in a small-sized and large capacity monolithic ceramic capacitor, a plated film of a soft solder, etc., is formed on the external electrode formed by baking an electrically conductive metal powder. An electrolytic plating method is generally used as the method of forming the plated film. In the case of forming the plated film on the fired electrode, there is a problem in that when the monolithic ceramic capacitor is immersed in the plating liquid, the liquid enters through the voids of the baked electrode and reaches the interface between the internal electrode and the dielectric ceramic layer to lower the reliability.

SUMMARY OF THE INVENTION

A primary object of the present invention is to provide a low-cost, small-sized, and large-capacity monolithic ceramic capacitor, wherein the dielectric constant is at least 3,000; when the insulation resistance is shown by the product with the electrostatic capacity (CR), the insulation resistances at 2 kV/mm and at room temperature and at 125° C. are at least 6,000 MΩ·μF and at least 2,000 MΩ·μF, respectively, and the insulation resistance at 20 kV/mm and at room temperature and at 125° C. are as high as 2,000 MΩ·μF and at least 500 MΩ·μF, respectively; the temperature characteristics of the electrostatic capacity satisfy the B characteristics prescribed by the JIS standard and the X7R characteristics prescribed by the EIA standard; and the reliability thereof is high even when a plated layer is formed on the external electrodes.

It has now been discovered that the above-described object can be achieved by the present invention as described hereinbelow.

A first aspect of the present invention is a monolithic ceramic capacitor comprising plural dielectric ceramic layers, at least a pair of internal electrodes sandwiching the dielectric ceramic layer between them, the edges of the internal electrodes being alternately exposed to both the edge surfaces of the above-described ceramic layers, and external electrodes formed such that each external electrode is electrically connected to the alternately exposed internal electrodes, wherein each dielectric ceramic layers is a material comprising, as principal components:

barium titanate containing alkali metal oxides as impurities in an amount of not more than about 0.02% by weight, at least one oxide selected from scandium oxide and yttrium oxide, at least one oxide selected from samarium oxide, europium oxide and gadolinium oxide, and at least one oxide selected from manganese oxide, cobalt oxide and nickel oxide, and magnesium oxide as a side component in an amount of from about 0.5 to 5.0 mols calculated as MgO to 100 mols of the principal component represented by the following component formula:

$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ wherein $M_2O_3$ is at least one of $Sc_2O_3$ and $Y_2O_3$; $Re_2O_3$ is at least one of $Sm_2O_3$, $Eu_2O_3$ and $Gd_2O_3$; and α, β, γ, m, x, and y are $0.0025 \leq \alpha+\beta \leq 0.025$,
$0 < \beta \leq 0.0075$,
$0.0025 \leq \gamma \leq 0.05$,
$\gamma/(\alpha+\beta) \leq 4$,
$0 \leq x < 1.0$,
$0 \leq y < 1.0$,
$0 \leq x+y < 1.0$, and
$1.000 < m \leq 1.035$, and further containing from about 0.2 to 3.0 parts by weight of an $Al_2O_3$—MO—$B_2O_3$ series oxide glass, wherein MO is at least one oxide selected from BaO, CaO, SrO, MgO, ZnO, and MnO, to 100 parts by weight of the sum total of the principal components and magnesium oxide.

Preferably, the alkali metal impurity is about 0.012% by weight or less, $0.004 \leq \alpha+\beta \leq 0.02$, $0.001 \leq \beta \leq 0.005$, $0.015 \leq \gamma \leq 0.04$, $\gamma/(\alpha+\beta) \leq 3$, $0.05 \leq x \leq 0.5$, $0.05 \leq y \leq 0.6$, $0.2 \leq x+y \leq 0.6$, $1.005 \leq m \leq 1.015$, the MgO is about 0.8–1.2 mol per hundred, and the amount of glass is about 0.8–1.5 parts by weight. Preferably, the composition contains $Y_2O_3$ and $Sm_2O_3$ and MO includes BaO.

Also preferably, the above-described internal electrodes are composed of nickel or a nickel alloy.

A second aspect of the present invention is a monolithic ceramic capacitor of the first aspect, wherein when the triangular coordinates of $\{Al_2O_3, MO, B_2O_3\}$, wherein the unit is mol %, is formed, the composition of the oxide glass of the $Al_2O_3$—MO—$B_2O_3$ series is in the inside of a domain surrounded by 6 lines connecting the 6 points of A (1, 14, 85)
B (20, 10, 70)
C (30, 20, 50)
D (40, 50, 10)
E (20, 70, 10)
F (1, 39, 60)

or on the lines.

A third aspect of the present invention is a monolithic ceramic capacitor of the first aspect wherein each external electrodes is composed of a sintered layer of an electrically conductive metal powder or an electrically conductive metal powder combined with a glass frit.

A fourth aspect of the present invention is a monolithic ceramic capacitor of the first aspect, wherein the external electrodes each is composed of a first layer made up of a sintered layer of an electrically conductive power or an electrically conductive powder added with a glass frit and a second layer made up of a plated layer formed on the first layer.

BRIEF DESCRIPTION OF THE DRAWINGS

FIG. 1 is a schematic cross-sectional view showing an embodiment of the monolithic ceramic capacitor of the present invention, FIG. 2 is a schematic plane view showing a dielectric ceramic layer having an internal electrode as an embodiment of the present invention, FIG. 3 is an exploded perspective view showing an embodiment of the ceramic laminate of the present invention.

DETAILED DESCRIPTION OF THE INVENTION

Figure 4:
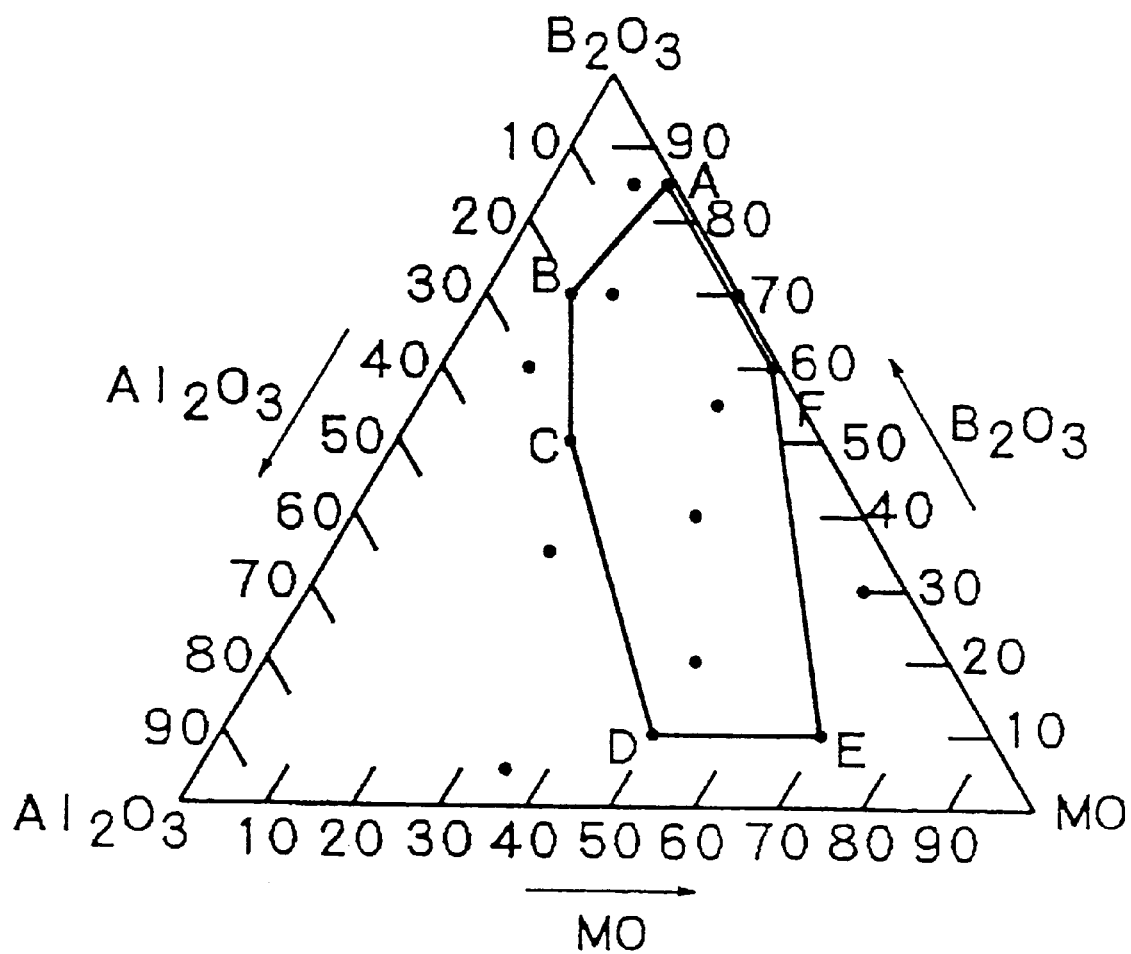
FIG. 4 is a 3-component composition triangular composition diagram of $\{Al_2O_3, MO, and B_2O_3\}$ showing the composition range of the $Al_2O_3$—MO—$B_2O_3$ series oxide glass in the present invention.

The present invention is described in detail below.

In the monolithic ceramic capacitor of the present invention, by using a dielectric ceramic material comprising barium titanate, at least one oxide selected from scandium oxide and yttrium oxide, at least one oxide selected from samarium oxide, europium oxide and gadolinium oxide, and at least one oxide selected from manganese oxide cobalt oxide and nickel oxide, adjusted in the above-described component ratio and combined with magnesium oxide and an oxide glass of the $Al_2O_3$—MO—$B_2O_3$ series (wherein MO is at least one oxide selected from BaO, CaO, SrO, MgO, ZnO, and MnO) as the material of the dielectric ceramic layers, a monolithic ceramic capacitor which can be calcined without deteriorating the characteristics thereof even when it is calcined in a reducing atmosphere, the temperature characteristics of the electrostatic capacity of which satisfy the B characteristics prescribed by the JIS standard and the X7R characteristics prescribed by the ETA standard, and which has a high insulation resistance at room temperature and high temperature under a high electric field strength and has a high reliability, can be obtained.

Also, because the crystal grain sizes of the dielectric ceramic layers obtained are small as 1 $\mu$m or smaller, the number of the crystal grains existing in each dielectric ceramic layer can be increased, whereby even when the thickness of each dielectric ceramic layer of the monolithic ceramic capacitor is thinned, lowering of the reliability can be prevented.

Further, it has been confirmed that of the principal components of the dielectric ceramic material of the dielectric ceramic layer composed of barium titanate, at least one oxide selected from scandium oxide and yttrium oxide, at least one oxide selected from samarium oxide, europium oxide and gadolinium oxide, and at least one oxide selected from manganese oxide, cobalt oxide and nickel oxide, there slightly exist alkaline earth metal oxides such as SrO, CaO, etc., alkali metal oxides such as $Na_2O$, $K_2O$, etc., and other oxides such as $Al_2O_3$, $SiO_2$, etc., as impurities in the barium titanate. of these impurities, the content of particularly the alkali metal oxide such as $Na_2O$, $K_2O$, etc., have a large influence on the electric characteristics of the monolithic ceramic capacitor.

That is, it has been confirmed that by using barium titanate wherein the content of alkali metal oxides existing therein as impurities are not more than about 0.02% by weight, a dielectric constant of 3,000 or higher is obtained.

Furthermore, it has been confirmed that by adding an oxide glass of $Al_2O_3$—MO—$B_2O_3$ (wherein MO is at least one oxide selected from BaO, CaO, SrO, MgO, ZnO, and MnO) as the principal components into the dielectric ceramic layer, the sintering property becomes good and also the plating resistance is improved. When a dielectric ceramic layer is formed using the dielectric ceramic material as described above, a small-sized and large capacity monolithic ceramic capacitor showing less temperature change of electrostatic capacity and having a high reliability can be realized and also it becomes possible to use nickel or a nickel alloy or each metal combined with a small amount of a ceramic powder as the internal electrodes.

There is no particular restriction on the composition of the external electrodes. For example, the external electrode may by composed of, for example, a sintered layer of each of various electrically conductive metal powders such as Ag, Pd, Ag—Pd, Cu, Cu alloys, etc., or a sintered layer of the above-described electrically conductive metal powder and various glass frits such as a $B_2O_3$—$Li_2O$—$SiO_2$—Bao series glass frit, a $B_2O_3$—$SiO_2$—Bao series glass frit, a $B_2O_3$—$SiO_2$—ZnO series glass frit, an $Li_2O$—$SiO_2$—BaO series glass frit, etc. Also, a small amount of a ceramic powder may be combined together with the electrically conductive metal powder and the glass frit. More preferably, a plated layer is formed on the sintered layer and the plated layer may be a plated layer only of Ni, Cu, an Ni—Cu alloy, etc., or the plated layer may further have thereon a plated layer of a soft solder, tin, etc.

The present invention is described more practically based on an embodiment of the invention but the invention is not limited to the embodiment.

FIG. 1 is a schematic cross-sectional view showing an embodiment of the monolithic ceramic capacitor of the present invention, FIG. 2 is a schematic plane view showing a dielectric ceramic layer having an internal electrode as an embodiment of the present invention, and FIG. 3 is an exploded perspective view of an embodiment of the ceramic laminate of the present invention.

As shown in FIG. 1, a monolithic ceramic capacitor 1 of the present invention is a rectangular parallelepiped-form chip-type capacitor composed of a ceramic laminate 3 of laminating plural dielectric ceramic layers 2a, 2b, internal electrodes 4, and external electrodes 5 formed at both edge surfaces of the ceramic laminate 3 composed of first plated layers 6 of nickel, copper, etc., and second plated layers 7 of a soft solder, tin, etc.

The production method of the monolithic ceramic capacitor 1 of the present invention as described above is explained in the order of the production steps.

First, the ceramic laminate 3 is formed. As shown in FIG. 2, using a slurry of the material powders comprising barium titanate at least one oxide selected from scandium oxide and yttrium oxide, at least one oxide selected from samarium oxide, europium oxide and gadolinium oxide, at least one oxide selected from manganese oxide, cobalt oxide and nickel oxide, magnesium oxide, and an $Al_2O_3$—MO—$B_2O_3$ series oxide glass (wherein MO is at least one oxide selected from BaO, CaO, SrO, MgO, ZnO, and MnO) as the principal components, a sheet-form dielectric ceramic layer (green sheet) is prepared and an internal electrode 4 made of nickel or a nickel alloy is formed on one surface of layer. The internal electrode 4 may be formed by a screen printing method, a vapor deposition method, or a plating method.

Then, as shown in FIG. 3, the necessary number of the dielectric ceramic layers 2b each having an internal electrode 4 are laminated and sandwiched between dielectric ceramic layers 2a which have no internal electrode 4, followed by pressing to form a laminate. Thereafter, the laminated ceramic layers 2a, 2b . . . 2b, 2a are calcined in a reducing atmosphere to form the ceramic laminate 3.

Next, two external electrodes 5 are formed at both edge surfaces of the ceramic laminate 3 so as to be connected to the internal electrodes 4.

As the material for the external electrodes 5, the same material as the internal electrodes 4 can be used. Also, silver, palladium, silver-palladium alloy, copper, copper alloy, etc., can be used as the material for the external electrodes and further a material made up of the above-described metal powder combined with a glass frit such as a $B_2O_3$—$SiO_2$—BaO series glass, an $Li_2O$—$SiO_2$—BaO series glass, etc, may be also used as the material for the external electrodes.

That is, a proper material is selected according to the use and the contemplated environment of the monolithic ceramic capacitor.

The external electrodes 5 can be formed by coating an electrically conductive paste composed of the metal powder, which becomes the material forming the external electrodes, on both the edge surfaces of the ceramic laminate 3 obtained by calcining, followed by baking but in another method, the electrically conductive paste is coated on both the edge surfaces of the ceramic laminate 3 before calcining and the external electrodes 5 may be formed simultaneously with calcining the ceramic laminate 3. Thereafter, plating of nickel, copper, etc., is applied to each of the external electrodes 5 to form the first plated layer 6. Finally, the second plated layer 7 of a soft solder, tin, etc., is applied onto the first plated layer 6 to produce the chip-type monolithic ceramic capacitor 1.

The present invention is described in more detail by the following Examples below.

EXAMPLE 1

First, after preparing and weighing $TiCl_4$ and $Ba(NO_3)_2$ of various purities as starting materials, they were precipitated with oxalic acid as barium titanyl oxalate ($BaTiO(C_2O_4)$ $C_4H_2O$) to obtain precipitates. The precipitates were decomposed by heating to a temperature of 1,000° C. or higher to provide four kinds of barium titanates ($BaTiO_3$) shown in Table 1 below.

TABLE 1

| Kind of $BaTiO_3$ | Content of impurities (wt %) | | | | | Mean grain size ($\mu$m) |
|---|---|---|---|---|---|---|
| | Alkali metal oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

After weighing, mixing, and grinding the oxide, carbonate, and hydroxide of each component such that they had the composition ratio of $0.25Al_2O_3$-$0.17BaO$-$0.03MnO$-$0.55B_2O_3$ (mol ratio), the ground mixture was subjected to evaporation to dryness to obtain a powder. After melting by heating the powder to 1,300° C. in an aluminum crucible, the powder was quenched and ground, whereby an oxide glass powder having an average grain size of 1 $\mu$m or smaller was obtained.

Then, $BaCO_3$ for controlling the Ba/Ti mol ratio m of barium titanate and $Sc_2O_3$, $Y_2O_3$, $Sm_2O_3$, $Eu_2O_3$, $Gd_2O_3$, $MnCO_3$, NiO, CoO and MgO, each having a purity of 99% or higher, were prepared. These raw material powders were compounded with the above-described oxide glass powder such that the component ratios became those shown in Table 2 below to provide compounded products.

TABLE 2

| Sample No. | Kind of $BaTiO_3$ | $(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ | | | | | | | | | | | | | | Oxide MgO % | Glass (part by weight) |
|---|---|---|---|---|---|---|---|---|---|---|---|---|---|---|---|---|---|
| | | $M(\times 10^{-2})$ | | $\alpha \times 10^{-2}$ | $Re(\times 10^{-2})$ | | | $\beta \times 10^{-2}$ | $\alpha + \beta \times 10^{-2}$ | $\beta/\alpha$ | $\gamma \times 10^{-2}$ | $\dfrac{\gamma}{\alpha+\beta}$ | x | y | x + y | m | | |
| | | Sc | Y | | Sm | Eu | Gd | | | | | | | | | | | |
| 1* | A | — | — | — | — | — | — | — | — | 2.0 | — | 0.20 | 0.20 | 0.40 | 1.015 | 1.0 | 1.0 |
| 2* | A | — | 0.60 | 0.60 | 0.10 | — | — | 0.10 | 0.70 | 1/6 | — | — | — | — | 1.010 | 1.0 | 0.8 |
| 3* | A | — | 0.80 | 0.80 | — | — | — | — | 0.80 | — | 1.5 | 15/8 | 0.10 | 0.30 | 0.40 | 1.010 | 0.8 | 1.5 |
| 4* | A | — | 0.60 | 0.60 | — | — | 0.10 | 0.10 | 0.70 | 1/6 | 2.0 | 20/7 | 0.20 | 0.20 | 0.40 | 0.990 | 1.0 | 1.2 |
| 5* | A | — | 0.60 | 0.60 | 0.20 | — | — | 0.20 | 0.80 | 1/3 | 2.5 | 25/8 | 0.20 | 0.40 | 0.60 | 1.000 | — | 0.8 |
| 6* | A | — | 0.80 | 0.80 | 0.15 | — | — | 0.15 | 0.95 | 3/16 | 2.0 | 40/19 | 0.10 | 0.20 | 0.30 | 1.015 | 0.1 | 0.1 |
| 7* | A | — | 0.70 | 0.70 | 0.30 | — | — | 0.30 | 1.0 | 3/7 | 2.0 | 2 | 0.30 | 0.10 | 0.40 | 1.015 | 0.8 | — |
| 8 | A | — | 0.15 | 0.15 | — | 0.10 | — | 0.10 | 0.25 | 2/3 | 0.25 | 1 | 0.20 | 0.10 | 0.30 | 1.015 | 1.0 | 0.8 |
| 9 | B | — | 2.0 | 2.0 | 0.50 | — | — | 0.50 | 2.5 | 1/4 | 5.0 | 2 | 0.05 | 0.20 | 0.25 | 1.010 | 1.0 | 1.2 |
| 10 | A | — | 0.75 | 0.75 | 0.25 | — | — | 0.25 | 1.0 | 1/3 | 4.0 | 4 | 0.10 | 0.30 | 0.40 | 1.010 | 1.2 | 1.0 |
| 11 | C | — | 1.25 | 1.25 | 0.75 | — | — | 0.75 | 2.0 | 3/5 | 4.0 | 2 | — | — | — | 1.015 | 1.0 | 1.2 |
| 12 | A | — | 0.50 | 0.50 | 0.50 | — | — | 0.50 | 1.0 | 1 | 3.0 | 3 | 0.10 | 0.30 | 0.40 | 1.035 | 0.8 | 1.5 |
| 13 | A | 0.10 | 0.50 | 0.60 | — | — | 0.10 | 0.10 | 0.70 | 1/6 | 2.0 | 20/7 | — | 0.60 | 0.60 | 1.010 | 1.2 | 1.5 |
| 14 | A | — | 0.60 | 0.60 | 0.25 | — | — | 0.25 | 0.85 | 5/12 | 1.5 | 30/17 | 0.50 | — | 0.50 | 1.015 | 1.0 | 1.2 |
| 15 | A | 0.05 | 0.50 | 0.55 | 0.05 | 0.05 | 0.05 | 0.15 | 0.70 | 3/11 | 2.5 | 5/3 | 0.10 | 0.10 | 0.20 | 1.015 | 1.0 | 3.0 |
| 16 | A | 0.05 | 0.55 | 0.60 | 0.05 | 0.05 | — | 0.10 | 0.70 | 1/6 | 2.5 | 25/7 | 0.10 | 0.30 | 0.40 | 1.010 | 1.2 | 3.0 |
| 17 | A | — | 0.60 | 0.60 | 0.10 | 0.10 | — | 0.20 | 0.80 | 1/3 | 2.5 | 25/8 | 0.05 | 0.20 | 0.25 | 1.005 | 0.5 | 0.2 |
| 18 | A | — | 0.60 | 0.60 | 0.05 | — | 0.05 | 0.10 | 0.70 | 1/6 | 2.5 | 25/7 | 0.05 | 0.20 | 0.25 | 1.015 | 1.2 | 1.5 |
| 19 | A | — | 0.60 | 0.60 | — | 0.10 | 0.10 | 0.20 | 0.80 | 1/3 | 2.5 | 25/8 | 0.05 | 0.20 | 0.25 | 1.015 | 1.2 | 1.5 |
| 20 | A | — | 0.50 | 0.50 | 0.25 | — | — | 0.25 | 0.75 | 1/2 | 2.0 | 40/15 | 0.10 | 0.30 | 0.40 | 1.005 | 5.0 | 1.5 |
| 21 | A | — | 0.40 | 0.40 | 0.50 | — | — | 0.50 | 0.90 | 5/4 | 2.5 | 25/9 | 0.20 | 0.10 | 0.30 | 1.015 | 1.2 | 1.0 |
| 22* | A | — | 2.4 | 2.4 | 0.60 | — | — | 0.60 | 3.0 | 1/4 | 1.5 | 1/2 | 0.10 | 0.30 | 0.40 | 1.010 | 1.2 | 1.0 |
| 23* | A | — | 1.8 | 1.8 | 0.30 | — | — | 0.30 | 2.1 | 1/6 | 8.0 | 8/21 | 0.30 | 0.10 | 0.40 | 1.005 | 1.0 | 1.0 |
| 24* | A | — | 0.60 | 0.60 | 0.15 | — | — | 0.15 | 0.75 | 1/4 | 4.0 | 8/15 | 0.20 | 0.20 | 0.40 | 1.010 | 1.0 | 0.8 |
| 25* | A | — | 0.50 | 0.50 | — | 0.90 | — | 0.90 | 1.4 | 9/5 | 2.0 | 10/7 | 0.10 | 0.30 | 0.40 | 1.015 | 0.8 | 0.8 |
| 26* | A | — | 0.60 | 0.60 | — | 0.10 | — | 0.10 | 0.70 | 1/6 | 1.5 | 15/7 | 1.00 | — | 1.00 | 1.010 | 0.8 | 1.0 |
| 27* | A | — | 0.75 | 0.75 | 0.25 | — | — | 0.25 | 1.0 | 1/3 | 2.0 | 2 | — | 1.00 | 1.00 | 1.010 | 1.2 | 1.0 |
| 28* | A | — | 0.60 | 0.60 | 0.20 | — | — | 0.20 | 0.80 | 1/3 | 1.2 | 3/2 | 0.40 | 0.60 | 1.00 | 1.010 | 0.8 | 1.2 |
| 29* | A | — | 0.80 | 0.80 | 0.15 | — | — | 0.15 | 0.95 | 3/16 | 2.0 | 100/19 | 0.10 | 0.30 | 0.40 | 1.050 | 1.0 | 1.2 |
| 30* | A | — | 0.75 | 0.75 | 0.10 | — | — | 0.10 | 0.85 | 2/15 | 2.0 | 100/17 | 0.20 | 0.20 | 0.40 | 1.010 | 8.0 | 1.5 |
| 31* | A | — | 0.60 | 0.60 | 0.15 | — | — | 0.15 | 0.75 | 1/4 | 2.5 | 10/3 | 0.20 | 0.10 | 0.30 | 1.010 | 1.0 | 6.0 |
| 32* | D | — | 0.80 | 0.80 | 0.20 | — | — | 0.20 | 1.0 | 1/4 | 3.0 | 3 | 0.10 | 0.20 | 0.30 | 1.015 | 1.0 | 1.0 |

Mark* is outside the scope of the invention.

To each of the compounded products thus obtained were added a polyvinyl butyral series binder and an organic solvent such as ethanol, etc., and the mixture was wet blended by a ball mill to prepare a ceramic slurry. Thereafter, the ceramic slurry was formed into a sheet by the doctor blade method to provide a rectangular green sheet having a thickness of 11 μm. Then, an electrically conductive paste containing Ni as the principal component was printed on the above-described ceramic green sheet to form an electrically conductive paste layer for constituting an internal electrode.

The plural ceramic green sheets, each having formed thereon the electrically conductive paste layer, one side of which protruded from one side of the sheet, were prepared. These plural ceramic green sheets were laminated such that the protruded sides of the electrically conductive paste layers were alternated to provide a laminate. After firing the binder by heating the laminate obtained to a temperature of 350° C. in a nitrogen gas atmosphere, the laminate was fired in a reducing atmosphere made up of $H_2$, $N_2$, and $H_2O$ gases at an oxygen partial pressure of from $10^{-9}$ to $10^{-12}$ MPa for 2 hours at the temperature shown in Table 3 below to provide a ceramic sintered material.

The surface of the ceramic sintered material obtained was observed by a scanning electron microscope at a magnification of 1,500 and grain sizes were measured.

After calcining, a silver paste containing a $B_2O_3$—$Li_2O$—$SiO_2$—$BaO$ series glass frit was coated on both the edge surfaces of the sintered material obtained and baked in a nitrogen gas atmosphere at a temperature of 600° C. to form external electrodes electrically connected to the internal electrodes alternately.

The size of the external form of the monolithic ceramic capacitor obtained as described above was (width) 1.6 mm, by (length) 3.2 mm, by (thickness) 1.2 mm. The thickness of the dielectric ceramic layer disposed between the internal electrodes was 8 μm.

The total number of the effective dielectric ceramic layers was 19 and the area of the counter electrode per layer was 2.1 mm².

The electric characteristics of these monolithic ceramic capacitors obtained were measured. The electrostatic capacity (C) and the dielectric loss (tan δ) were measured using an automatic bridge-type measuring apparatus at a frequency of 1 kHz, 1 Vrms and a temperature of 25° C., and also the dielectric constant (ε) was calculated from the electrostatic capacity.

To measure the insulation resistance (R), the insulation resistances (R) at 25° C. and 125° C. were measured using an insulation resistance meter by applying a direct current voltage of 16 V for 2 minutes, and the product of the electrostatic capacity (C) and the insulation resistances (R), that is, the CR product was obtained.

To measure the insulation resistance (R) in the electric field of 20 kV/mm, the insulation resistance (R) at 25° C. and 125° C. were measured in the same manner by applying a direct current voltage of 160 V for 2 minutes, and then the CR product was obtained.

Furthermore, the changing ratio of the electrostatic capacity to the temperature change was measured.

In addition, the changing ratio of the electrostatic capacity to a temperature change changing ratios ($\Delta$)C/C20° C.) at −25° C. and 85° C. with the electrostatic capacity at 20° C. as the standard, the changing ratios ($\Delta$)C/C25° C.) at −55° C. and 125° C. with the electrostatic capacity at 25° C. as the standard, and the value (max) that the changing ratio was maximum in absolute value within the range of from −55° C. to 125° C. were determined.

As a high-temperature loading life test, 36 samples were prepared in each case and the change of the insulation resistance of each of the samples with the passage of time was measured at a temperature of 150° C. by applying a direct current voltage of 100 V. In a high-temperature loading life test, the time at which the insulation resistance value (R) of each sample became $10^6\Omega$ or lower was defined as the life time and the average life time of the life times of all the samples was determined.

The results of the above-described tests are shown in Table 3 below.

TABLE 3

| Sample No. | Firing Temperature °C. | Dielectric Constant ε | Dielectric Loss tan δ % | Capacity Temperature Changing Ratio % | | | | | CR Product R (MΩ · μF) | | | | Average Life Time hr | Grain Size μm |
|---|---|---|---|---|---|---|---|---|---|---|---|---|---|---|
| | | | | ΔC/C 20° C. | | ΔC/C 25° C. | | | 2.0 KV/mm applied | | 20 KV/mm applied | | | |
| | | | | −25° C. | 85° C. | −55° C. | 125° C. | max | 25° C. | 125° C. | 25° C. | 125° C. | | |
| 1* | 1280 | 2810 | 2.4 | −5.1 | 17.4 | −11.2 | 11.8 | 26.1 | 6300 | 1710 | 5220 | 530 | 56 | 0.87 |
| 2* | 1280 | Unmeasurable because of becoming semiconductor | | | | | | | | | | | | 2.10 |
| 3* | 1280 | 3430 | 2.1 | −0.3 | −7.3 | −1.2 | −9.1 | 9.2 | 6990 | 2810 | 3020 | 730 | 318 | 0.75 |
| 4* | 1280 | Unmeasurable because of becoming semiconductor | | | | | | | | | | | | 1.70 |
| 5* | 1280 | 3280 | 2.3 | −0.5 | −9.2 | −0.8 | 15.2 | 15.2 | 5090 | 1550 | 1730 | 410 | 303 | 0.71 |
| 6* | 1360 | Unmeasurable because of insufficient sintering | | | | | | | | | | | | 0.63 |
| 7* | 1360 | Unmeasurable because of becoming semiconductor | | | | | | | | | | | | 0.61 |
| 8 | 1300 | 4120 | 2.5 | −0.3 | −9.9 | −9.7 | −13.5 | 13.5 | 7170 | 2820 | 2970 | 850 | 563 | 0.64 |
| 9 | 1300 | 3040 | 1.7 | −2.3 | −5.1 | −2.4 | −5.4 | 9.1 | 5960 | 2230 | 2490 | 610 | 657 | 0.67 |
| 10 | 1300 | 3460 | 1.8 | −0.2 | −8.1 | −0.9 | −9.3 | 9.3 | 7450 | 2790 | 2980 | 750 | 549 | 0.68 |
| 11 | 1300 | 3210 | 1.4 | 0.5 | −8.5 | 0.6 | −12.8 | 12.8 | 6580 | 2430 | 2600 | 720 | 602 | 0.79 |
| 12 | 1300 | 3420 | 1.6 | 0.3 | −9.3 | 0.6 | −13.2 | 13.2 | 6690 | 2450 | 2590 | 560 | 616 | 0.67 |
| 13 | 1300 | 3210 | 1.5 | −0.1 | −7.9 | −0.8 | −8.6 | 8.6 | 6120 | 2280 | 2420 | 640 | 651 | 0.69 |
| 14 | 1300 | 3610 | 1.4 | 0.0 | −7.3 | −0.6 | −8.3 | 8.3 | 7750 | 2870 | 3080 | 650 | 515 | 0.67 |
| 15 | 1300 | 3770 | 1.3 | −0.7 | −5.9 | −2.1 | −6.7 | 6.7 | 6390 | 2290 | 2410 | 540 | 579 | 0.66 |
| 16 | 1300 | 3780 | 1.4 | −0.9 | −6.0 | −2.0 | −7.0 | 7.0 | 6420 | 2320 | 2440 | 580 | 582 | 0.67 |
| 17 | 1300 | 3650 | 1.9 | −0.1 | −8.3 | −1.0 | −9.6 | 9.6 | 6780 | 2240 | 2670 | 610 | 601 | 0.70 |
| 18 | 1300 | 3770 | 1.6 | 0.1 | −8.6 | −0.1 | −9.7 | 9.7 | 6800 | 2280 | 2710 | 630 | 588 | 0.72 |

TABLE 3-continued

| Sample No. | Firing Temperature °C. | Dielectric Constant ε | Dielectric Loss tan δ % | Capacity Temperature Changing Ratio % | | | | | CR Product R (MΩ · μF) | | | | Average Life Time hr | Grain Size μm |
|---|---|---|---|---|---|---|---|---|---|---|---|---|---|---|
| | | | | ΔV/C 20° C. | | ΔC/C 25° C. | | | 2.0 kV/mm applied | | 20 kV/mm applied | | | |
| | | | | −25° C. | 85° C. | −55° C. | 125° C. | max | 25° C. | 125° C. | 25° C. | 125° C. | | |
| 19 | 1300 | 3620 | 1.8 | −0.2 | −8.2 | −0.4 | −9.5 | 9.5 | 6770 | 2250 | 2660 | 620 | 598 | 0.71 |
| 20 | 1300 | 3980 | 1.6 | −0.5 | −6.2 | −0.8 | −10.9 | 10.9 | 6850 | 2680 | 2700 | 590 | 605 | 0.66 |
| 21 | 1300 | 3530 | 1.7 | 1.1 | −9.8 | 1.5 | −13.4 | 13.4 | 7020 | 2790 | 2800 | 650 | 564 | 0.69 |
| 22* | 1360 | 2190 | 1.6 | −0.3 | −7.1 | −1.2 | −8.4 | 8.4 | 2650 | 910 | 1000 | 320 | 217 | 0.65 |
| 23* | 1300 | 3470 | 1.8 | 1.4 | −12.3 | 0.9 | −18.2 | 18.2 | 6120 | 450 | 3830 | 470 | 333 | 0.75 |
| 24* | 1300 | 3430 | 1.7 | 1.1 | −12.1 | 0.4 | −18.4 | 18.4 | 6030 | 1730 | 2070 | 520 | 382 | 0.74 |
| 25* | 1300 | 3350 | 2.2 | 2.2 | −11.6 | 3.4 | −17.2 | 17.2 | 6590 | 2280 | 2560 | 590 | 574 | 0.73 |
| 26* | 1300 | 3240 | 1.9 | −0.5 | −9.4 | −1.2 | −11.1 | 11.1 | 3620 | 610 | 1370 | 340 | 198 | 0.72 |
| 27* | 1300 | 3110 | 1.4 | −0.6 | −7.3 | −1.5 | −8.6 | 8.6 | 3790 | 540 | 1130 | 280 | 228 | 0.70 |
| 28* | 1300 | 3070 | 1.8 | −0.9 | −7.2 | −0.1 | −11.4 | 11.4 | 3150 | 940 | 1120 | 200 | 199 | 0.69 |
| 29* | 1360 | | | Unmeasurable because of insufficient sintering | | | | | | | | | | 0.61 |
| 30* | 1360 | 2380 | 1.2 | −1.2 | −10.5 | −1.6 | −16.7 | 6.7 | 6270 | 1260 | 3090 | 590 | 480 | 0.65 |
| 31* | 1260 | 2080 | 1.7 | −0.8 | −2.3 | −0.9 | 5.8 | 5.8 | 6730 | 3650 | 2340 | 1970 | 524 | 0.71 |
| 32* | 1300 | 2420 | 1.5 | −0.1 | −4.7 | 0.2 | −5.6 | 5.6 | 7050 | 2340 | 2750 | 640 | 503 | 0.66 |

Mark* is outside the scope of the invention.

As is clear from Tables 1 to 3 above, it can be seen that in the monolithic ceramic capacitors of the present invention, the dielectric constant is as high as 3,000 or higher, the dielectric loss is 2.5% or lower, and the changing ratio of the electrostatic capacity to temperature satisfy the B characteristic standard prescribed by the JIS standard in the range of from −25° C. to 85° C. and satisfy the X7R characteristic standard prescribed by the EIA standard in the range of from −55° C. to 125° C.

Also, when the insulation resistances at 25° C. and 125° C. in a high electric field strength of 20 kV/mm are shown by the CR product, they show high values as 2,000 MΩ·μF or higher and 500 MΩ·μF or higher, respectively.

Also, the average life time is long as 500 hours or longer.

Furthermore, sintering can be carried out at a relatively low temperature of 1300° C. or lower and also, the grain sizes are small as 1 μm or less.

The reasons for limiting the composition of the dielectric ceramic materials used for the monolithic ceramic capacitors of the present invention are explained below.

In $(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (wherein $M_2O_3$ is at least one of $Sc_2O_3$ and $Y_2O_3$; and $Re_2O_3$ is at least one $Sm_2O_3$, $Eu_2O_3$, and $Gd_2O_3$), when the amount $(\alpha+\beta)$ of $(M_2O_3+Re_2O_3)$ is less than about 0.0025 as in Sample No. 1, the dielectric constant is lower than 3,000, the temperature changing ratio of the electrostatic capacity becomes large, the insulation resistance of a high voltage at 125° C. is lowered regardless of the low or high electric field strength, and the average life time is extremely shortened.

When the amount $(\alpha+\beta)$ of $(M_2O_3+Re_2O_3)$ exceeds about 0.025 as in Sample No. 22, the dielectric constant is lower than 3,000, the insulation resistances at 25° C. and 125° C. are lowered, the average life time becomes short, and the sintering temperature becomes high.

When the amount γ of (Mn, Ni, Co)O is less than about 0.0025 as in Sample No. 2, the dielectric ceramic calcined in a reducing atmosphere is reduced to become a semiconductor-like material and the insulation resistance is lowered.

When the amount γ of (Mn, Ni, Co)O exceeds about 0.05 as in Sample No. 23, the insulation resistance at 125° C. is lowered regardless of the low or high electric field strength and the average life time is shortened. Also, the temperature changing ratio of the electrostatic capacity in this case becomes large.

When the dielectric ceramic material contains no Mn as in Sample Nos. 26, 27, and 28, the insulation resistance is lowered and the average life time becomes shorter than 500 hours.

When the amount β of $Re_2O_3$ is 0 as in Sample No. 3, the average life time becomes shorter than 500 hours.

When the amount β of $Re_2O_3$ exceeds about 0.0075 as in Sample No. 25, the temperature changing ratio of the electrostatic capacity becomes large and does not satisfy the B characteristics of the JIS standard and the X7R characteristics of the EIA standard.

When the ratio $\gamma/(\alpha+\beta)$ of the amount γ of (Mn, Ni, Co)O to the amount $(\alpha+\beta)$ of $(M_2O_3+Re_2O_3)$ exceeds about 4 as in Sample No. 30, the temperature changing ratio of the electrostatic capacity becomes large, the insulation resistance at 125° C. at 2.0 kV/mm does not satisfy 2,000 MΩ·μF, and the average life time becomes shorter than 500 hours.

When the amount x of NiO or the amount y of CoO is 1.0 as in Sample No. 26 or 27, the insulation resistance at 125° C. at 2.0 kV/mm is lowered and the insulation resistances at 25° C. and 125° C. at 20 kV/mm do not satisfy 2,000 MΩ·μF and 500 MΩ·μF, respectively, and the average life time becomes shorter than 500 hours.

When the mol ratio m of barium titanate is not more than about 1.000 as in Sample Nos. 4 and 5, the dielectric ceramics become semiconductor-like materials to lower the insulation resistance when calcined in a reducing atmosphere and the average life time becomes extremely short.

When the mol ratio m of barium titanate exceeds about 1.035 as in Sample No. 29, the sintering property becomes extremely inferior.

When the amount of MgO is less than about 0.1 mol as in Sample No. 5, the insulation resistance at 20 kV/mm is lowered, the average life time becomes shorter than 500 hours, and the temperature changing ratio of the electrostatic capacity cannot satisfy the B characteristics prescribed by the JIS standard and the X7R characteristics prescribed by the EIA standard.

When the amount of MgO exceeds about 5.0 mols as in Sample No. 30, the sintering temperature becomes high, the dielectric constant becomes lower than 3,000, and the average life time does not exceed 500 hours.

When the amount of the $Al_2O_3$—MO—$B_2O_3$ series oxide glass is less than about 0.2 part by weight as in Sample No. 6, the sintering becomes deficient.

When the amount of the $Al_2O_3$—MO—$B_2O_3$ series oxide glass exceeds about 3.0 parts by weight as in Sample No. 31, the dielectric constant does not exceed 3,000.

When the amount of alkali metal oxides contained in barium titanate as impurities exceeds about 0.02 part by weight as in Sample No. 32, lowering of the dielectric constant occurs.

EXAMPLE 2

As the dielectric ceramic material, using the barium titanate A shown in Table 1 above, a raw material was prepared such that a composition having MgO 1.2 mols to 98.0 mols of $\{BaO\}_{1.010} \cdot TiO_2 + 0.9Y_2O_3 + 0.4Eu_2O_3 + 1.0(Mn_{0.3}Ni_{0.7})O$ was obtained. Each of the $Al_2O_3$—MO—$B_2O_3$ series oxide glasses having average grain sizes of 1 μm or smaller shown in Table 4 below prepared by heating to a temperature of from 1,200 to 1,500° C. by the same method as in Example 1 was combined with the raw material, and external electrodes made of silver electrically connected to the internal electrode were formed in the same method as in Example 1 to prepare monolithic ceramic capacitors. In addition, the external form and the dimensions of each of the monolithic ceramic capacitors prepared were the same as in Example 1.

TABLE 4

| Oxide Glass (wt. %) | $Al_2O_3$ | Components of Oxide Glass (mol %) | | | | | | | |
|---|---|---|---|---|---|---|---|---|---|
| | | M | | | | | | MO | $B_2O_3$ |
| | | Ba | Ca | Sr | Mg | Zn | Mn | | |
| 33 | 1.0 | 1 | 5 | 5 | — | — | — | 4 | 14 | 85 |
| 34 | 1.0 | 20 | 8 | — | — | — | 2 | — | 10 | 70 |
| 35 | 1.0 | 30 | 6 | 10 | 2 | 2 | — | — | 20 | 50 |
| 36 | 1.0 | 40 | — | 30 | — | — | 5 | 15 | 50 | 10 |
| 37 | 1.0 | 20 | — | 30 | — | — | 10 | 30 | 70 | 10 |
| 38 | 1.0 | 1 | — | 5 | 5 | 24 | 5 | — | 39 | 60 |
| 39 | 1.0 | 15 | 10 | — | — | — | 3 | 2 | 15 | 70 |
| 40 | 1.0 | 10 | 10 | 15 | — | 5 | — | 5 | 45 | 55 |
| 41 | 1.0 | 20 | — | 30 | 5 | — | 3 | 2 | 40 | 40 |
| 42 | 1.0 | 30 | 5 | 35 | 5 | — | 5 | — | 50 | 20 |
| 43* | 1.0 | 10 | 5 | — | — | — | — | — | 5 | 85 |
| 44* | 1.0 | 30 | 5 | 5 | — | — | — | — | 10 | 60 |
| 45* | 1.0 | 40 | 20 | — | — | — | 3 | 2 | 25 | 35 |
| 46* | 1.0 | 60 | 30 | — | — | — | 3 | 2 | 35 | 5 |
| 47* | 1.0 | 5 | 15 | 35 | 10 | — | 3 | 2 | 65 | 30 |
| 48* | 1.0 | — | 15 | 15 | — | — | — | — | 30 | 70 |

Mark * is out side the scope of the invention.

The electric characteristics of the monolithic ceramic capacitors thus prepared were measured.

The electrostatic capacity (C) and the dielectric constant (tan δ) of each of these samples were measured using an automatic bridge-type measurement apparatus at a frequency of 1 kHz, 1 Vrms and a temperature of 25° C. and also the dielectric constant (ε) was calculated from the electrostatic capacity. Then, to measure the insulation resistance (R) at the electric field of 20 kV/mm, using an insulation resistor, the insulation resistances (R) at 25° C. and 125° C. of each sample were measured by applying a dielectric current voltage of 160 V for 2 minutes and then the CR product was obtained.

Furthermore, the changing ratio of the electrostatic capacity to a temperature change was measured.

In addition, about the changing ratio of the electrostatic capacity to a temperature change, the changing ratios (ΔC/C20° C.) at –25° C. and 85° C. with the electrostatic capacity at 20° C. as the standard, the changing ratios (ΔC/C25° C.) at –55° C. and 125° C. with the electrostatic capacity at 25° C. as the standard, and the value (max) that the changing ratio was maximum in absolute value within the range of from –55° C. to 125° C. were determined.

After measuring, a nickel plating liquid containing nickel sulfate, nickel chloride and boric acid was prepared and nickel plating was applied on the silver external electrodes by a barrel plating method.

Finally, a soft solder plating liquid composed of an AS bath (alkanol-sulfonic acid) was prepared and solder-plated on the nickel plated films to provide monolithic ceramic capacitors having thus plated external electrodes.

For each monolithic ceramic capacitor, the electrostatic capacity (C) was measured using an automatic bridge-type measurement apparatus at a frequency of 1 kHz, 1 Vrms and a temperature of 25° C. Then, to measure the insulation resistance (R) in the electric field of 20 kV/mm, using an insulation resistor, the insulation resistances (R) of each sample at 25° C. and 125° C. were measured by applying a direct current voltage of 160° C. for 2 minutes and the CR product was obtained.

The results are shown in Table 5 below.

TABLE 5

| Sample No. | Firing Temperature ° C. | Dielectric Constant ε | Dielectric Loss tan δ % | Temperature Dependence of Capacitance % | | | | | 20 kV/mm applied) MΩ · μF | | | |
|---|---|---|---|---|---|---|---|---|---|---|---|---|
| | | | | ΔC/C 20° C. | | ΔC/C 25° C. | | | Before plating | | After plating | |
| | | | | –25° C. | 85° C. | –55° C. | 125° C. | max | 25° C. | 125° C. | 25° C. | 125° C. |
| 33 | 1260 | 3100 | 1.7 | –0.9 | –6.7 | –1.4 | –7.6 | 7.6 | 2670 | 860 | 2640 | 840 |
| 34 | 1260 | 3270 | 1.8 | –0.6 | –6.9 | –1.2 | –7.8 | 7.8 | 2610 | 780 | 2590 | 780 |
| 35 | 1280 | 3380 | 1.8 | –0.2 | –7.7 | –0.1 | –9.6 | 9.7 | 2820 | 830 | 2810 | 820 |
| 36 | 1300 | 3470 | 2.0 | –0.1 | –8.1 | 0.1 | –11.4 | 11.4 | 3300 | 1020 | 3300 | 1020 |
| 37 | 1300 | 3360 | 1.9 | –0.4 | –7.1 | –0.8 | –8.5 | 8.6 | 2620 | 790 | 2620 | 780 |

TABLE 5-continued

| Sample No. | Firing Temperature °C. | Dielectric Constant ε | Dielectric Loss tan δ % | Temperature Dependence of Capacitance % | | | | | 20 kV/mm applied) MΩ · μF | | | |
|---|---|---|---|---|---|---|---|---|---|---|---|---|
| | | | | ΔC/C 20° C. | | ΔC/C 25° C. | | | Before plating | | After plating | |
| | | | | −25° C. | 85° C. | −55° C. | 125° C. | max | 25° C. | 125° C. | 25° C. | 125° C. |
| 38 | 1280 | 3190 | 1.8 | −0.9 | −6.8 | −0.9 | −7.4 | 7.4 | 2670 | 780 | 2670 | 780 |
| 39 | 1260 | 3200 | 1.7 | −1.1 | −6.5 | −1.2 | −7.0 | 7.0 | 2590 | 790 | 2580 | 770 |
| 40 | 1280 | 3330 | 1.8 | −0.5 | −7.4 | −0.3 | −8.3 | 8.3 | 2790 | 760 | 2780 | 760 |
| 41 | 1300 | 3290 | 1.9 | −0.4 | −7.1 | −1.1 | −8.1 | 8.1 | 2760 | 840 | 2760 | 820 |
| 42 | 1280 | 3560 | 2.0 | −0.1 | −7.9 | 0.0 | −12.1 | 12.1 | 3160 | 950 | 3160 | 950 |
| 43* | 1360 | 3380 | 2.6 | −1.6 | −5.1 | −1.9 | −6.3 | 6.3 | 1090 | 140 | 80 | 7 |
| 44* | 1360 | | | Unmeasurable owing to insufficient sintering | | | | | | | | |
| 45* | 1360 | | | Unmeasurable owing to insufficient sintering | | | | | | | | |
| 46* | 1360 | 3970 | 2.8 | −10.1 | −9.1 | −14.5 | −17.2 | 21.0 | 2040 | 400 | 120 | 40 |
| 47* | 1360 | | | Unmeasurable owing to insufficient sintering | | | | | | | | |
| 48* | 1260 | 3090 | 1.7 | −1.6 | −6.0 | −2.0 | −6.5 | 6.5 | 2260 | 590 | 690 | 160 |

As is clear from Tables 4 and 5 described above, the dielectric constant in the monolithic ceramic capacitors of the present invention composed of the dielectric ceramic layer containing the $Al_2O_3$—Mo—$B_2O_3$ series oxide glass, is high as 3,000 or higher, the dielectric loss is 2.5% or lower, and the changing ratios of the electrostatic capacity to temperature satisfy the B characteristic standard prescribed by the JIS standard in the range of from −25° C. to 85° C. and the X7R characteristic standard prescribed by the EIA standard in the range of from −55° C. to 125° C. Also, when plating is applied, the electric characteristics are not deteriorated.

Now, the reasons for limiting the composition of the oxide glass used for the monolithic ceramic capacitor of the present invention are explained.

In composition diagram of $\{Al_2O_3, MO, B_2O_3\}$ of the $Al_2O_3$—MO—$B_2O_3$ (wherein MO is at least one oxide selected from BaO, CaO, SrO, MgO, ZnO and MnO) series oxide glasses, Sample Nos. 43 to 48 do not exist inside a domain surrounded by the 6 lines connecting the 6 points of a point A when the composition is that $Al_2O_3$ is 1 mol %, MO is 14 mol % and $B_2O_3$ is 85 mol %; point B where the composition that $Al_2O_3$ is 20 mol %, MO is 10 mol % and $B_2O_3$ is 70 mol %; point C where the composition is that $Al_2O_3$ is 30 mol %, MO is 20 mol % and $B_2O_3$ is 50 mol %; point D where the composition that $Al_2O_3$ is 40 mol %, MO is 50 mol % and $B_2O_3$ is 10 mol %; point E where the composition is that $Al_2O_3$ is 20 mol %, MO is 70 mol % and $B_2O_3$ is 10 mol %; and point F where the composition is that $Al_2O_3$ is 1 mol %, MO is 39 mol % and $B_2O_3$ is 60 mol % and do not exist on the above-described 6 lines. The sintering of these samples is insufficient or after sintering, the insulation resistance is extremely lowered by plating.

Although in the above-described examples, a powder of barium titanate prepared by an oxalic acid method was used, the barium titanate is not limited in the present invention to the above-described powder but a barium titanate powder prepared by an alkoxide method or a hydrothermal synthetic method may be used. By using the latter barium titanate powder, it is possible that the characteristics of the monolithic ceramic capacitor obtained are better than those shown in the examples described above.

Also, although scandium oxide, yttrium oxide, samarium oxide, europium oxide, gadolinium oxide, manganese oxide, cobalt oxide, nickel oxide and magnesium oxide powders were used in the above-described examples, the present invention, not limited to these powders but even when the solutions of the alkoxides, organic metals, etc., are used, the characteristics of the monolithic ceramic capacitors obtained are not reduced if they are compounded such that the dielectric ceramic layer of the range of the present invention is constituted.

Because the monolithic ceramic capacitor of the present invention is constituted by the dielectric ceramic material which is neither reduced nor converted into a semiconductor by calcining in a reducing atmosphere, nickel or a nickel alloy, which is a base material, can be used as the electrode material, the dielectric ceramic material can be calcined at a relatively low temperature of 1,300° C. or lower, and the cost for the monolithic ceramic capacitor can be reduced.

In a monolithic ceramic capacitor using the dielectric ceramic capacitor, the dielectric constant is 3,000 or higher and the temperature change of the dielectric constant is small.

Also, the insulation resistance in a high electric field is high and the life time at a high temperature is long. Accordingly, even when the thickness of the dielectric ceramic layer is reduced, it is unnecessary to lower the rated voltage.

Furthermore, when the dielectric ceramic layer is thinned, the number of the crystal grains existing in the laminated ceramic layer can be increased as compared with conventional monolithic ceramic capacitors because the crystal grain sizes are small as 1 μm or smaller. Thus, a small-sized and large capacity monolithic ceramic capacitor having high reliability can be obtained. Also, the monolithic ceramic capacitor of the present invention can cope with surface mounting because the electric characteristics are not deteriorated by plating.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising: a pair of external electrodes;
   a plurality of juxtaposed dielectric layers disposed between said external electrodes, and
   at least two internal electrodes each of which is disposed between dielectric layers which are adjacent to one another,
   wherein each of said dielectric layers comprise:

barium titanate containing alkali metal oxides impurities in an amount of not more than about 0.02% by weight, at least one oxide selected from the group consisting of scandium oxide and yttrium oxide, at least one oxide selected from the group consisting of samarium oxide, europium oxide and gadolinium oxide, and at least an oxide of at least manganese or manganese with at least one of cobalt and nickel and further containing magnesium oxide in an amount of from about 0.5 to 5.0 mols calculated as MgO to 100 mols of a principal component represented by the component formula:

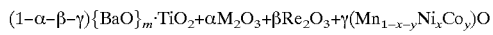

wherein M is at least one of Sc and Y; Re is at least one of Sm, Eu and Gd; and $\alpha$, $\beta$, $\gamma$, m, x, and y are
$0.0025 \leq \alpha+\beta \leq 0.025$,
$0 < \beta \leq 0.0075$,
$0.0025 \leq \gamma \leq 0.05$,
$\gamma/(\alpha+\beta) \leq 4$,
$0 \leq x < 1.0$, $0 \leq y < 1.0$, $0 \leq x+y < 1.0$, and
$1.000 \leq m \leq 1.035$, and further containing from about 0.2 to 3.0 parts by weight of an $Al_2O_3$—MO—$B_2O_3$ oxide glass, wherein M is at least one oxide selected from the group consisting of B, Ca, Sr, Mg Zn and Mn, to 100 parts by weight of the principal component and magnesium oxide.

2. A monolithic ceramic capacitor of claim 1, wherein the alkali metal impurity is about 0.012% by weight or less, $0.004 \leq \alpha+\beta \leq 0.02$, $0.001 \leq \beta \leq 0.005$, $0.015 \leq \gamma \leq 0.04$, $\gamma/(\alpha+\beta) \leq 3$, $0.05 \leq x \leq 0.5$, $0.05 \leq y \leq 0.6$, $0.2 \leq x+y \leq 0.6$, $1.005 \leq m \leq 1.015$, the MgO is about 0.8–1.2 mol per hundred, and the amount of glass is about 0.8–1.5 parts by weight.

3. A monolithic ceramic capacitor of claim 2, wherein the dielectric layers contains $Y_2O_3$, $Sm_2O_3$ and wherein MO comprises BaO.

4. A monolithic ceramic capacitor of claim 3, wherein the composition of the $Al_2O_3$—MO—$B_2O_3$ oxide glass is inside a domain of a triangular concentration diagram of $\{Al_2O_3, MO, B_2O_3\}$, wherein the unit is mol %, surrounded by 6 lines connecting 6 points of A (1, 14, 85)
B (20, 10, 70)
C (30, 20, 50)
D (40, 50, 10)
E (20, 70, 10)
F (1, 39, 60)

or on the lines.

5. A monolithic ceramic capacitor of claim 4, wherein each external electrode is composed of a sintered layer of an electrically conductive metal powder or an electrically conductive metal powder combined with a glass frit.

6. A monolithic ceramic capacitor of claim 5, wherein the internal electrodes are of nickel or a nickel alloy.

7. A monolithic ceramic capacitor of claim 4, wherein each of said external electrodes is composed of a first layer made up of a sintered layer of an electrically conductive power or an electrically conductive powder combined with a glass frit and a second plated layer formed on the first layer.

8. A monolithic ceramic capacitor of claim 7, wherein the internal electrodes are of nickel or a nickel alloy.

9. A monolithic ceramic capacitor of claim 3, wherein the composition of the $Al_2O_3$—MO—$B_2O_3$ oxide glass is inside a domain of a triangular concentration diagram of $\{Al_2O_3, MO, B_2O_3\}$, wherein the unit is mol %, surrounded by 6 lines connecting 6 points of A (1, 14, 85)
B (20, 10, 70)
C (30, 20, 50)
D (40, 50, 10)
E (20, 70, 10)
F (1, 39, 60)

or on the lines.

10. A monolithic ceramic capacitor of claim 9, wherein each external electrode is composed of a sintered layer of an electrically conductive metal powder or an electrically conductive metal powder combined with a glass frit.

11. A monolithic ceramic capacitor of claim 9, wherein each of said external electrodes is composed of a first layer made up of a sintered layer of an electrically conductive power or an electrically conductive powder combined with a glass frit and a second plated layer formed on the first layer.

12. A monolithic ceramic capacitor of claim 1, wherein each external electrode is composed of a sintered layer of an electrically conductive metal powder or an electrically conductive metal powder combined with a glass frit.

13. A monolithic ceramic capacitor of claim 1, wherein each of said external electrodes is composed of a first layer made up of a sintered layer of an electrically conductive power or an electrically conductive powder combined with a glass frit and a second plated layer formed on the first layer.

14. A monolithic ceramic capacitor of claim 1, wherein the internal electrodes are of nickel or a nickel alloy.

15. A dielectric ceramic composition comprising:

barium titanate containing alkali metal oxides as impurities in an amount of not more than about 0.02% by weight, at least one oxide selected from the group consisting of scandium oxide and yttrium oxide, at least one oxide selected from the group consisting of samarium oxide, europium oxide and gadolinium oxide, and at least an oxide of at least manganese or manganese with at least one of cobalt and nickel further comprising magnesium oxide in an amount of from about 0.5 to 5.0 mols calculated as MgO to 100 mols of a principal components represented by the following component formula:

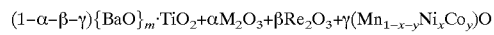

wherein M is at least one member selected from Sc and Y; Re is at least one member selected from Sm, Eu, and Gd; and $\alpha$, $\beta$, $\gamma$, m, x, and y are
$0.0025 \leq \alpha+\beta \leq 0.025$,
$0 < \beta \leq 0.0075$,
$0.0025 \leq \gamma \leq 0.05$,
$\gamma/(\alpha+\beta) \leq 4$,
$0 \leq x < 1.0$, $0 \leq y < 1.0$, $0 \leq x+y < 1.0$, and
$1.000 < m \leq 1.035$, and further containing from about 0.2 to 3.0 parts by weight of an $Al_2O_3$—MO—$B_2O_3$ oxide glass, wherein M is at least one oxide selected from Ba, Ca, Sr, Mg, Zn and Mn, to 100 parts by weight of the principal component and magnesium oxide.

16. A dielectric ceramic composition of claim 15, wherein the composition of the of the $Al_2O_3$—MO—$B_2O_3$ oxide glass is in the inside of a domain of the triangular concentration diagram of $\{Al_2O_3, MO, B_2O_3\}$, wherein the unit is mol %, surrounded by 6 lines connecting 6 points of A (1, 14, 85)
B (20, 10, 70)
C (30, 20, 50)
D (40, 50, 10)
E (20, 70, 10)
F (1, 39, 60)

or on the lines.

17. A dielectric ceramic composition of claim 16, wherein the alkali metal impurity is about 0.012% by weight or less, $0.004 \leq \alpha+\beta \leq 0.02$, $0.001 \leq \beta \leq 0.005$, $0.015 \leq \gamma \leq 0.04$, $\gamma/(\alpha+\beta) \leq 3$, $0.05 \leq x \leq 0.5$, $0.05 \leq y \leq 0.6$, $0.2 \leq x+y \leq 0.6$, $1.005 \leq m \leq 1.015$, the MgO is about 0.8–1.2 mol per hundred, and the amount of glass is about 0.8–1.5 parts by weight.

18. A dielectric ceramic composition of claim 17, wherein the dielectric layers contains $Y_2O_3$, $Sm_2O_3$ and wherein MO comprises BaO.

19. A dielectric ceramic composition of claim 15, wherein the alkali metal impurity is about 0.012% by weight or less, $0.004 \leq \alpha+\beta \leq 0.02$, $0.001 \leq \beta \leq 0.005$, $0.015 \leq \gamma \leq 0.04$, $\gamma/(\alpha+\beta) \leq 3$, $0.05 \leq x \leq 0.5$, $0.05 \leq y \leq 0.6$, $0.2 \leq x+y \leq 0.6$, $1.005 \leq m \leq 1.015$, the MgO is about 0.8–1.2 mol per hundred, and the amount of glass is about 0.8–1.5 parts by weight.

20. A dielectric ceramic composition of claim wherein the dielectric layers contains $Y_2O_3$, $Sm_2O_3$ and rein MO comprises BaO.

* * * * *